United States Patent [19]

Takemori et al.

[11] Patent Number: 5,261,678
[45] Date of Patent: Nov. 16, 1993

[54] DUST-PROOF BOOT AND METHOD FOR MOUNTING THE SAME

[75] Inventors: Fumio Takemori, Hanyu; Kazuhisa Kinoshita, Konosu; Hiroshi Ikegami, Kuki; Shinji Aoyagi, Hanyu; Seiya Odaka, Kazo; Toshiyuki Negishi, Kumagaya, all of Japan

[73] Assignee: Akebono Brake Industry Co., Ltd., Tokyo, Japan

[21] Appl. No.: 860,459

[22] Filed: Mar. 30, 1992

[30] Foreign Application Priority Data

Mar. 29, 1991 [JP] Japan .................. 3-20233[U]

[51] Int. Cl.$^5$ .................. B61F 15/22; F16J 9/08
[52] U.S. Cl. .................. 277/212 FB; 188/73.44; 74/18.2; 92/128
[58] Field of Search .......... 188/73.44, 73.45; 74/18.2; 92/34, 128; 277/212 R, 212 E, 212 F, 212 FB

[56] References Cited

U.S. PATENT DOCUMENTS

| 4,448,287 | 5/1984 | Katagiri et al. | 188/73.31 |
| 4,469,337 | 9/1984 | Yokoi et al. | 188/73.44 |
| 4,508,018 | 4/1985 | Choinski et al. | 74/18.2 |
| 4,530,506 | 7/1985 | Weiler et al. | 188/73.44 |
| 4,629,641 | 12/1986 | Paullin | 92/34 |
| 4,754,854 | 7/1988 | Adachi et al. | 74/18.2 |
| 4,860,571 | 8/1989 | Smedberg et al. | 267/119 |
| 4,926,979 | 5/1990 | Odaka | 188/73.44 |

Primary Examiner—Robert J. Oberleitner
Assistant Examiner—Chris Schwartz
Attorney, Agent, or Firm—Knobbe, Martens, Olson & Bear

[57] ABSTRACT

A dust-proof boot comprising an internal engaging ring extended from one end of an expansible bellows portion and an external engaging ring provided upwardly thereof and capable of being spread is provided at an extended base of the internal engaging ring with an air flow port for guiding pressure from the inside of the bellows portion into the internal engaging ring. In mounting the dust-proof boot on a support provided with a guide hole, the internal engaging ring of the dust-proof boot is fitted into an internal groove of the support, after which compressed air is supplied from the interior of the bellows whereby the compressed air spreads the external engaging ring via the air flow port and the external engaging ring is fitted into an external groove.

5 Claims, 4 Drawing Sheets

DUST-PROOF BOOT AND METHOD FOR MOUNTING THE SAME

BACKGROUND OF THE INVENTION

The present invention relates to a dust-proof boot for dust proofing between a pin and a caliper, and a method for mounting the boot.

In a typical disk brake, as seen in FIG. 4, a caliper 1 is provided with a pair of pads for holding a disk 30 between opposite surfaces. The caliper 1 is slidably mounted in an axial direction of the disk 30 with respect to a support 32. Such a disk brake is disclosed in more detail in U.S. Pat. No. 4,448,287, issued to Katagiri, et al.

A pin 2 is slidably inserted into a hole formed in the caliper 1. The pin 2 is screwed into the support 32 which is secured to a vehicle body. A pair of pins 2 are provided on opposite ends of the caliper 1 for support, and allow the caliper to slide with respect to the support 32.

With respect to the construction of the peripheral portion of the dust-proof boot, as shown in FIG. 4, the pins 2 are slidably inserted into the caliper 1, and a dust-proof boot 22 is provided between the caliper 1 and each of the pins 2.

The dust-proof boot 22 has a bellows portion 23, which has a mounting portion for the caliper formed at one end and a mounting portion for the pin formed at the opposite end. The mounting portion for the caliper has an engaging projection extended in a radial direction. The engaging projection is fitted into an engaging annular groove provided in the caliper 1. The pin 2 is inserted into an engaging internal diameter portion of the bellows 23, whereby the dust-proof boot can be fixed. However, in this conventional structure, the assembly of the dust-proof boot is very complicated so that an automated assembly process is virtually impossible.

The present invention has been achieved in view of the foregoing, and provides an improved dust-proof boot and mounting method wherein a dust-proof boot can be mounted easily and firmly.

SUMMARY OF THE INVENTION

For solving the above-described technical problems, the present invention provides a dust-proof boot comprising an internal engaging ring extended from one end of an expansible bellows portion and an external engaging ring provided outwardly at the same end of the bellows portion. The external engaging ring is capable of being spread from an extended base of the internal engaging ring with an air flow port for guiding pressure internally of said bellows portion into the internal engaging ring.

In mounting the dust-proof boot on a support provided with a guide hole, the internal engaging ring of the dust-proof boot is fitted into an internal groove of the support. Subsequently, compressed air is supplied from the interior of the bellows to the external engaging ring so that the compressed air spreads the external engaging ring to fit over an external groove of the support.

In the aforementioned arrangement, when the dust-proof boot (bellows portion) is pressurized after the internal engaging ring is inserted into the internal groove, pressurized air flows through an air flow port into a portion surrounded by the internal engaging ring, the external engaging ring and the end of the guide hole. As a result, the external engaging ring is spread by the air pressure and completely fitted in the external groove.

Therefore, according to the present invention, mounting of the external engaging ring to the external groove is easy. The dust-proof boot can be easily and firmly assembled, and an automated assembly process can be realized.

DESCRIPTION OF PREFERRED EMBODIMENTS OF THE INVENTION

Figure 1:
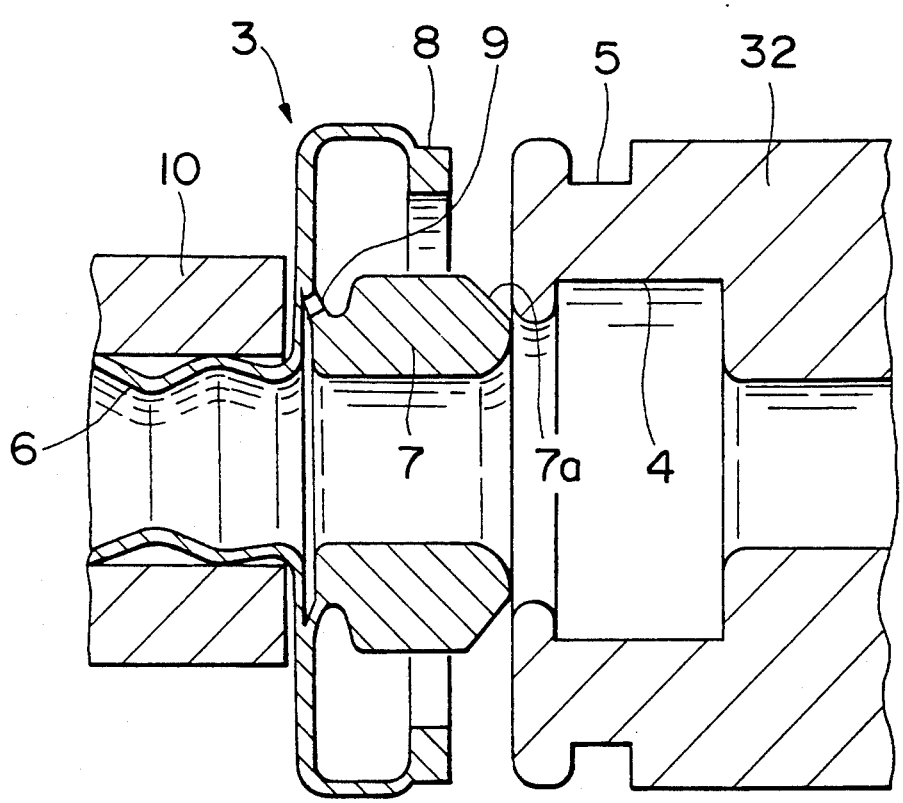
FIG. 1 is a sectional view showing one embodiment of the present invention.

An embodiment of the present invention will be described herein below with reference to FIGS. 1-3.

A dust-proof boot 3 is formed of a resilient material and is arranged between a support 32 and a pin 2 in order to prevent dust from entering.

The support 32 is provided with a guide hole 33. The guide hole includes an annular internal groove 4 provided in an internal wall. The support 32 includes an external groove 5 around the periphery of the guide hole 33.

Figure 3:
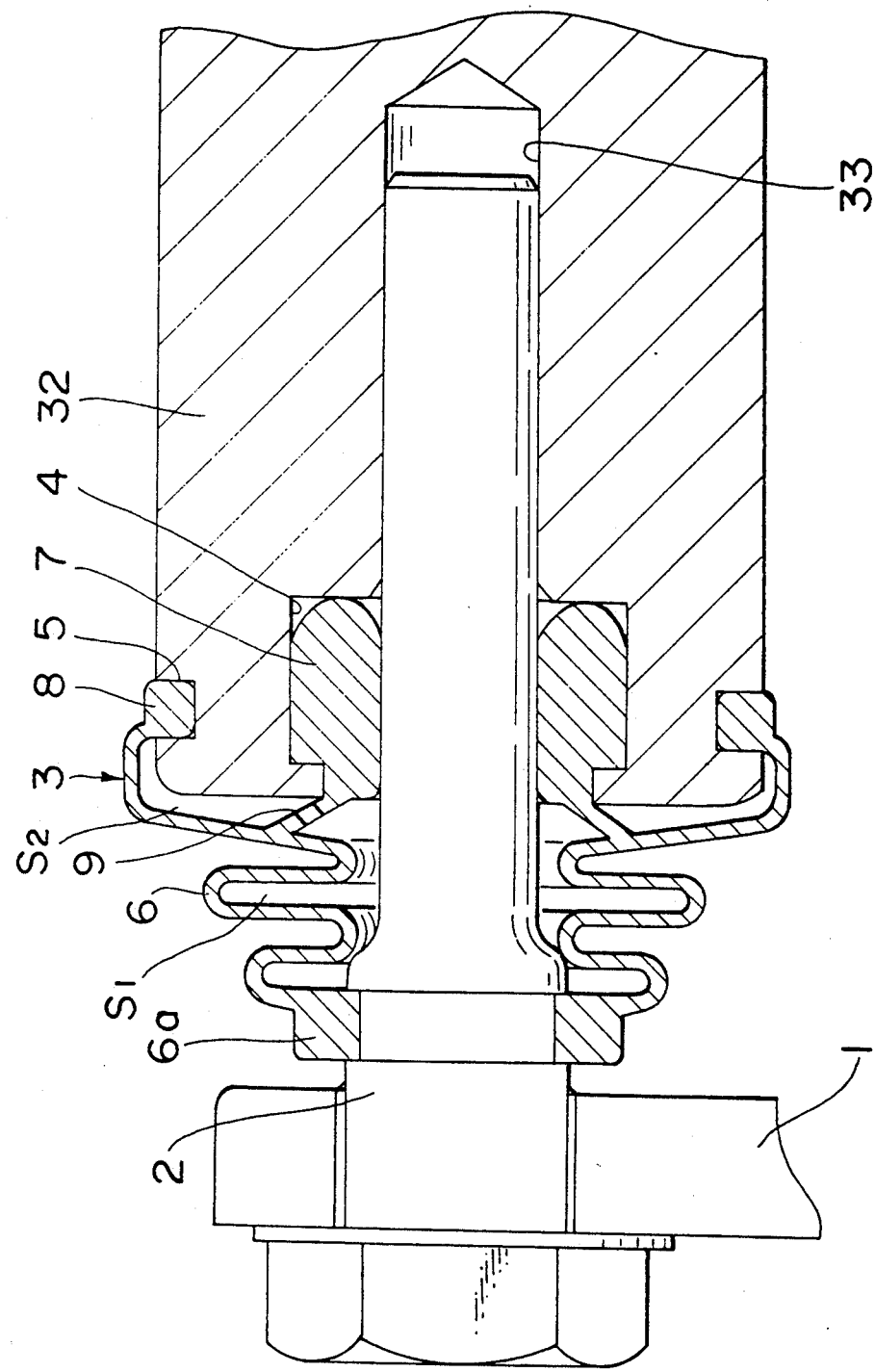
FIG. 3 is a sectional view of the assembled state of the present invention.
Figure 4:
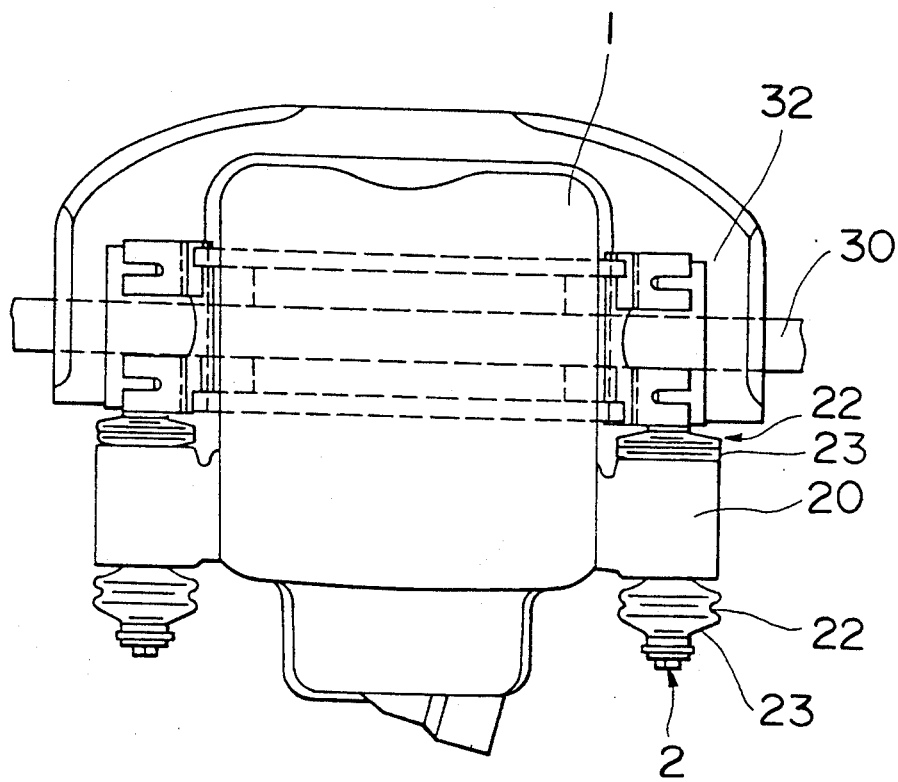
FIG. 4 is a plan view of a general disk brake of the prior art.

Referring to FIG. 3, the dust-proof boot 3 has an internal engaging ring 7 for engaging with the internal groove 4, and an external engaging ring 8 for engaging with the external groove 5, both engaging rings extending from one end of a tubular expansible bellows portion 6. The internal engaging ring 7 provides a frictional damping force to the pin 2 and is formed at the extreme end with a taper 7a. The internal engaging ring 7 has an air flow port 9 formed at a base portion. One air flow port 9 will suffice, but a plurality of air flow ports may be provided. The air flow port 9 is formed at one end of the bellows portion 6 in a branch connection portion between the internal engaging ring 7 and the external engaging ring 8.

The bellows portion 6 is provided on the other end thereof with a ring portion 6a sized to fix to the pin 2, which extends through the bellows portion and into the guide hole 33.

In mounting the dust-proof boot 3, a tubular first jig 10 is used for an initial assembly step, and a second jig 11, replacing the first jig, is used for a second assembly step.

As shown in FIG. 1, the first jig 10 receives the bellows portion 6 of the dust-proof boot 3 in an extended state and holds the bellows portion in a manner where the internal engaging ring 7 and the external engaging ring 8 project from the extreme end of the jig 10.

Figure 2:
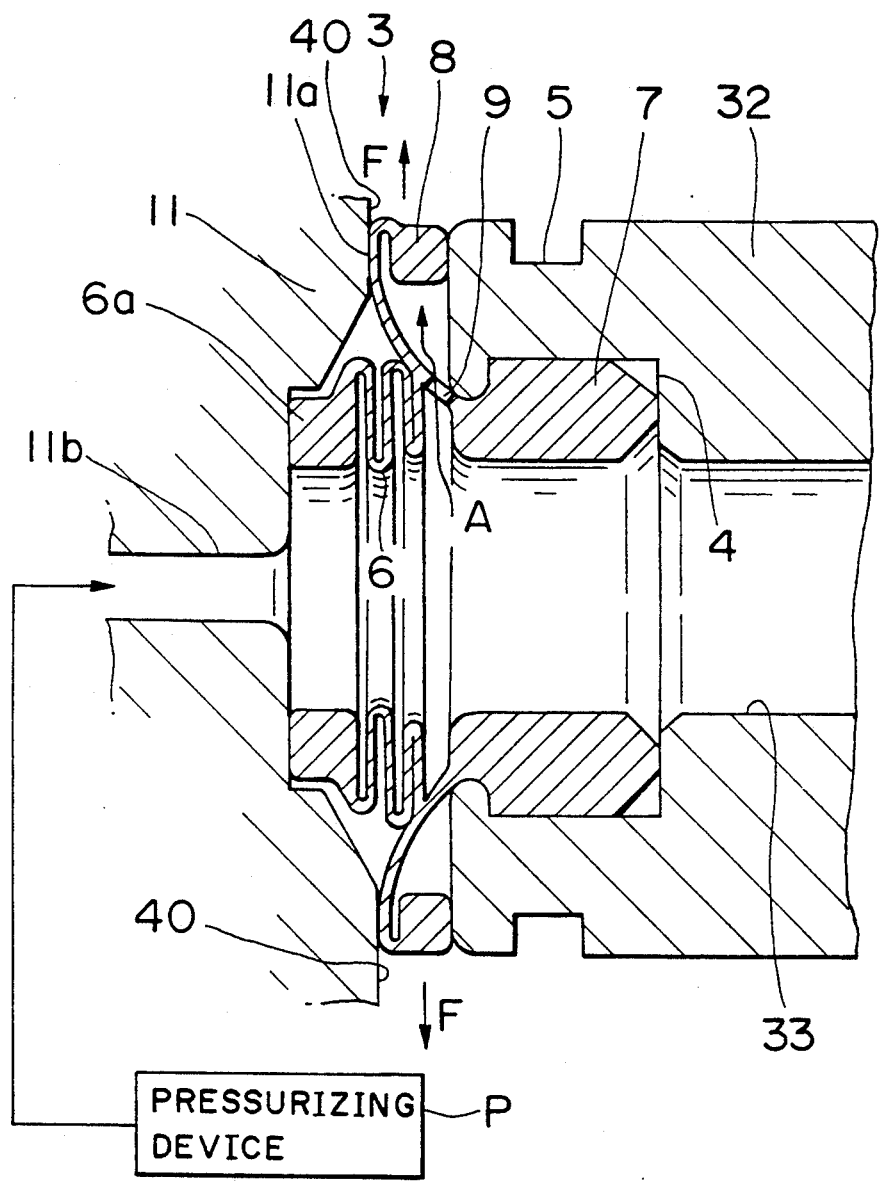
FIG. 2 is a sectional view of the assembling process of the present invention.

As shown in FIG. 2, the second jig 11 is formed with a communication hole 11b at a position coaxial with the center of the pin 2, and a pressurizing device P is connected to the communication hole 11b. Compressed air can be supplied into the guide hole 33 of the support 32 through the dust-proof boot 3. The second jig 11 has a pressing surface 40 substantially equal in size to an external diameter of the external engaging ring 8 when in the spread state.

The process for mounting the dust-proof boot 3 will be described herein below.

The dust-proof boot 3 is moved toward the support 32 with the bellows portion 6 being held within the tubular first jig 10 (FIG. 1).

The taper 7a of the internal engaging ring 7 is guided by the inner edge of the guide hole 33 of the support 32, and the internal engaging ring is mounted in the internal groove 4 by the first jig 10, as seen in FIG. 2.

The jig 10 is replaced by the second jig 11, and the external engaging ring 8 is lightly pressed and held between the support 32 and the pressing surface 40 of the second jig. Subsequently, compressed air A is supplied from the pressurizing device P into the dust-proof boot 3 through the communication hole 11b.

The compressed air A flows through the air flow port 9 into a portion surrounded by the internal engaging ring 7, the external engaging ring 8 and the support 32. The external engaging ring 8, lightly held between the support 32 and the second jig 11, is spread by the pressure. When the second jig 11 is further moved forward toward the support 32 after the external engaging ring 8 is fully spread, the external engaging ring is pressed by the pressing surface 40 to climb over the support 32 and into the external groove 5.

FIG. 3 shows the state where mounting of the dust-proof boot 3 is completed. In FIG. 3, the air flow port 9 merely extends between a space S1 formed between the outer peripheral surface of the pin 2 and the bellows portion 6, and a space S2 formed between the internal surface of the external engaging ring 8 and the end of the support 32, and thus the interior of the dust-proof boot 3 is isolated from the exterior. Because of this, entry of dust from the exterior is prevented.

What is claimed is:

1. A sealing boot providing a dust-free seal between said boot and a housing, comprising;
    an expandable portion;
    an outer sleeve extending from one end of said expandable portion sized to sealingly engage an exterior portion of said housing;
    an inner sleeve also extending from said one end of said expandable portion sized to engage an internal groove in said housing; and an air flow port communicating with a space adjacent said outer sleeve.

2. A dust-proof boot adopted to be mountable between a pin and a support member, comprising:
    an expansible bellows portion having a first end and a second end, said first end being mountable on said pin and said second end being mountable on said support member;
    an internal engaging ring extended from said second end of said bellows portion;
    an external engaging ring capable of being spread, said external engaging ring being extended from said one end of said bellows portion around said internal engaging ring; and
    an air flow port provided in an extended base of said internal engaging ring providing an air channel between the inside of the bellows portion into a space formed between said external engaging ring and said internal engaging ring such that air pressure from a source through said bellows portion causes said external engaging ring to spread.

3. A method for mounting a dust-proof boot having an expandable bellows on a support having a guide hole into which is inserted a pin for a disk brake, comprising:
    fitting an internal engaging ring of the dust-proof boot into an internal groove in an inner wall of the guide hole of the support with a first jig, said support being provided with an external groove in the vicinity of the extreme end of said guide hole; and thereafter
    supplying compressed air from a source through a second jig into the interior of said bellows, said compressed air flowing through said air flow port to spread an external engaging ring around said extreme end of said guide hole so that said external engaging ring is fitted into the external groove.

4. A method for mounting a dust-proof boot according to claim 3, comprising:
    moving said first jig toward said support to fit said internal engaging ring into the internal groove of said guide hole and removing said first jig, said first jig receiving therein said dust-proof boot in the state where the bellows portion is expanded and having the internal engaging ring and the external engaging ring of said dust-proof boot projected from an end thereof; and thereafter
    engaging said second jig with an exposed end of the dust-free boot into contact with said external engaging ring, and supplying compressed air from said source through a hole in said second jig into the interior of said bellows, said compressed air flowing into said air flow port to spread the external engaging ring, and thereafter moving said second jig further toward said support whereby said external engaging ring is caused to climb over the end of said support and engage said external groove.

5. A method for mounting a sealing boot on a housing, comprising:
    pressing an inner engaging sleeve extended from one end of said boot into an internal groove of said housing;
    supplying a pressurized gas from a source to the interior of said boot, said gas communicating with a space intermediate said inner engaging sleeve and an outer engaging sleeve via at least one air flow port in said inner engaging sleeve so that said outer engaging sleeve expands; and
    urging said outer engaging sleeve over said housing and into engagement with an external groove of said housing.

* * * * *